Sept. 4, 1923.                                          1,466,716
                         I. W. HENRY
                  ELECTRIC WELD FORGING METHOD
                  Original Filed Aug. 4, 1921
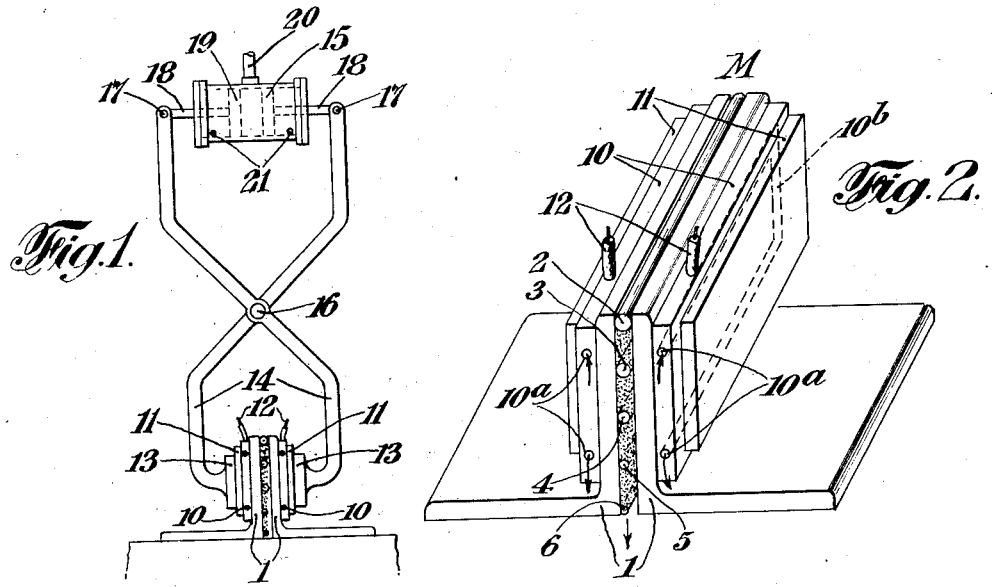
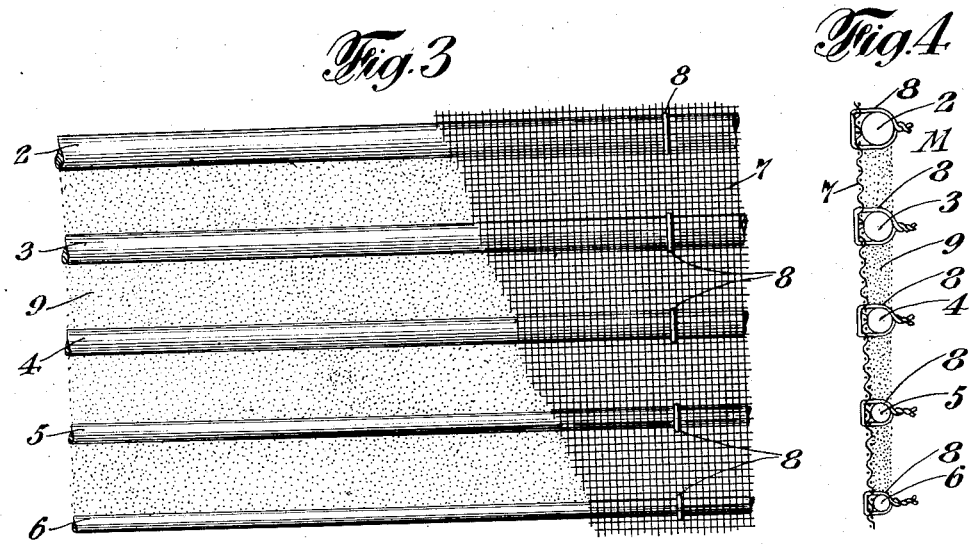
Ira W. Henry, Inventor
By his Attorney Patented Sept. 4, 1923.

1,466,716

UNITED STATES PATENT OFFICE.

IRA W. HENRY, OF NEW YORK, N. Y., ASSIGNOR, BY DIRECT AND MESNE ASSIGNMENTS, TO THE ELECTRIC FORGE CORPORATION, OF NEW YORK, N. Y., A CORPORATION OF DELAWARE.

ELECTRIC WELD FORGING METHOD.

Application filed August 4, 1921, Serial No. 489,869. Renewed November 23, 1922.

*To all whom it may concern:*

Be it known that I, IRA W. HENRY, a citizen of the United States, and resident of New York, in the county of New York and State of New York, have invented a certain new and useful Improvement in Electric Weld Forging Methods, of which the following is a specification.

This invention relates to an electric weld-forging method. I call the method electric-forging because the jointing effected is effected successively under pressure together of the fused surfaces to be united. The objects of the invention are to electrically weld under pressure, metallic surfaces together by the heat of an electric current with marked economy and with a practical result, to wit; a joint which, for large opposed surfaces, heretofore only imperfectly or partially welded by known electric welding processes, is of already demonstrated seeming perfection, in that the welded joints under tests have been proven to be stronger than the body of the metal welded, in respect to tensile strength; and to be welded together at all points of the opposed welded surfaces.

My new method and the herein shown, mat and joint are adapted for use in structural iron work as a substitute for riveting and bolting beams, plates and the like together in ship-building operations, the erection of buildings, the building of bridges and tunnels, pipe lines, welding of broken shafts, etc., all with a great saving of labor, together with a reduction of weight and economy of current.

My method may be practiced with either alternating current or with direct current apparatus.

The hereinafter described angle irons are merely typical of beams, girders, plates, pipes, flanges, etc., that are to be jointed by my new method and by use of my new welding mat which of and by itself constitutes a new article of manufacture that may be made in small pieces of any desired areas, but is preferably manufactured in long pieces, from which portions of required areas are cut off by the workmen for use in situ.

In the accompanying drawings illustrating the principle of this invention and the best mode now known to me of applying that principle, Fig. 1 is a side view, and Fig. 2 an end view of angle irons having opposed flanges to be jointed, and showing a welding mat interposed between the flanges; Fig. 1 also illustrating a power clamp applied to the flanges, and both figures indicate details of electric circuit connections.

Fig. 3 is a side elevation, and

Fig. 4 is an end elevation of the welding mat.

Referring to that form of the invention shown in the drawings, 1 indicates opposed angle iron flanges that are to be jointed together by the heating effect of an electric current with simultaneous pressure and by use of the welding mat, which is indicated by M. This mat comprises, in the form shown, a plurality, five as shown, of wires which are electric conductors, and which are spaced apart one from another in parallelism. These wires, from one edge portion to the opposite edge portion of the mat, decrease in diameter. Thus, as shown in Fig. 4, one edge wire 2 is of larger diameter than the next wire 3, which is of larger diameter than the next wire 4, which is of larger diameter than the next wire 5, which is of larger diameter than the other edge wire 6. In practice I find that No. 6 B. & S. gauge is a good size for the largest wire, and that No. 18 B. & S. gauge is a good size for the smallest wire, the intermediate wires varying decreasingly in diameter. It is noted that the electrical resistance of these wires corresponds to their respective cross-sectional areas. The wires are held apart and tied together by any suitable means, such, for example, as a piece of wire netting 7, such netting being also an electrical conductor and being meltable together with the wires 8 which tie the wires 2 to 6 to the netting. The conductor wires 2 to 6 are also meltable and the entire mat is melted into the joint formed by the present method. The mat is shown loaded or coated with a suitable flux 9, borax, for example, which is preferably fused in place as a portion of the mat, but which, if desired, may be incorporated with the metal elements of the mat when the latter is used.

Each flange 1 in working the method has applied to it a copper plate or electrode 10 along its exterior surface, the mat being located between the flanges 1. Exteriorly of each copper plate an insulating plate 11 is located and the terminals 12 for the electric current are attached to the copper plates, or electrodes. These copper plates or electrodes 10 are preferably provided with interior spaced apart water passages $10^a$, one communicating with the other through a conduit connection $10^b$. When in use, water may be admitted into the open end of one of the passages and allowed to escape through the open end of the other passage, as indicated by arrows in Fig. 2. The purpose of passing water through these electrodes 10 is to reduce their temperature when they are in use and become highly heated by the electric current passing through them.

When the current is established the circuit, of course, will be through the copper plates and the flanges 1 to and through the element of the mat having the largest diameter; for example, through the largest wire 2 of the mat which spaces the flanges apart, like a wedge, until it has become sufficiently melted to permit the flanges to contact with the next largest wire 3, which then serves to space the flanges apart until it becomes sufficiently melted to permit the next largest wire 4 to act as the effective spacer, and so on, through all the series of conducting wires comprised in the mat. During such action and the transformation of the mat, the flanges are under some kind of mechanical pressure whereby they are successively forced together, and I have shown, merely as illustrative of any suitable power device for the purpose, the heads 13 of hydraulic tongs applied to opposite sides of the assembled flanges, mat, copper or conducting plates and insulating plates, the arms 14 of the tongs being adapted to be pushed apart at their outer ends by pressure in a hydraulic cylinder construction 15, the tong arms 14 being pivoted together at their crossing 16, and their outer ends being respectively pivoted at 17 to a piston rod 18, each carrying a piston 19 within the cylinder for which a central water supply pipe 20 is provided for forcing the two pistons apart at the proper time and thereby compress the heads 13 opposedly against the insulating plates 11. The tong arms 14, which are, of course, of metal, span the assembled parts and are out of contact with them, and by the use of the insulating plates 11 the power application device is kept out of electrical connection with the assemblage of conductors, flanges and mat. The operation is almost instantaneous.

It will be observed that, when the flanges are under pressure, a practically gas tight joint is formed between the contacting walls of the flanges, initially with the largest wire or conductor 2; and as, initially, the opposed surfaces of the flanges do not bind on the smaller wires, such as 3, 4, 5 and 6, so as to form gas tight joints all gases generated by the fusing of the surfaces of the flanges and of the conductor 2, and of the flux, must travel downwardly in the direction of the vertical arrow shown in Fig. 2.

During the successive melting of the flux and metallic elements of the mat, gases are generated and they escape downwardly with force and are effective for blowing out, to a greater or less extent, the usual scale, dirt, etc. on the generally more or less oxidized opposed surfaces of the flanges, and thereby clean the surfaces to be united. Such generation, control and escape of the gases, which are of very high temperature, is a feature of the present invention, although an incident of the use of the successively consumable mat which, in whole and in part, disappears by being merged with and molecularly fused into the molecular constituents of the opposed melted surfaces, whereby the whole area or superficies of the opposed flange surfaces become entirely united in a wholly new kind of joint.

At first the contact between the flanges and the mat where the conductor 2 has the largest diameter is very slight, but as the conductor of the largest diameter melts and becomes expanded between the flanges that are under pressure one towards another the area of contact largely increases. This condition applies successively to the remainder of the mat as the diameters of its conductors 3, 4, 5 and 6, for example, are successively reduced. For this reason a current of very high amperage at low voltage may be used without formation of an arc; and as each conductor of the mat is successively heated and flattened its resistance increases with the heat as it is fused. The next wire of smaller diameter not being in physical contact with the flanges until the preceding one has been sufficiently fused and compressed to allow each next succeeding conductor to come into effective operation. Consequently, the electric current carrying capacity of the successively heated, melted and flattened surfaces of the conductors do not come into electrical contact with the flanges in their entirety until the moment of the fusing of the conductor of the least diameter. When the conductor of the least diameter has been fused the weld or forging is completed. This successive welding under pressure, which I consider to be in the nature of electric-forging, results in a substantial saving of current and also in practically and wholly, according to the experiments which I have hitherto conducted welding every part of the opposed flanges. Moreover, when in the prior art, surfaces of any considerable area are in complete, or approximately complete physical contact under pressure, and an electric welding current is applied, as in the welding of broken shafts and in the welding of plates, beams, girders, etc., buckling results and such buckling is one of the great disadvantages attending electric welding operations on all but relatively small opposed surfaces by prior art methods. Such buckling is occasioned because the welding current in striving to establish a circuit through a point or points of least resistance unequally heats the surfaces at various parts or points, with the result that the unequal heating causes the metal to bend, warp or buckle. By my invention, in consequence of the successive and relatively small areas of the heating and melting of the surfaces during the progress of the welding operation, the highly objectionable buckling of the prior art is minimized and in some cases eliminated.

What I claim is:

1. The method of electric welding, consisting in subjecting the parts to be welded to simultaneous pressure one towards another and to a suitable electric current for fusing opposed portions of said parts; and, during the application of the pressure and the flow of the current, in spacing the parts apart against the pressure, until the welding operation is completed, at successively reduced distances, by meltable, metallic, electric conductors of varying cross-sectional areas and in subjecting the conductors to the current and progressively fusing such conductors and uniting them in a fused state with the fused portions of the parts to be welded.

2. The method of electric welding, consisting in subjecting the parts to be welded to simultaneous pressure one towards another and to a suitable electric current for fusing opposed portions of such parts; and, during the application of the pressure and the flow of the current, in spacing the parts apart against the pressure until the welding operation is completed, at successively reduced distances, by meltable, metallic, electric conductors; and in subjecting the conductors to the current, and in successively fusing such conductors in the presence of a flux and uniting them in a fused state with the fused portions of the parts to be welded.

3. The method of electric welding, consisting in subjecting the parts to be welded to simultaneous pressure one towards another and to a suitable electric current for fusing opposed portions of such parts; and, during the application of the pressure and the flow of the current, in spacing apart, until the welding operation is completed, the parts to be welded against the pressure, by fusible, metallic electric conductors of diminishing cross-sectional areas; in successively fusing by said current the conductors and opposed portions of the parts to be welded, and in partially confining the gases attending such fusion between said parts and the fusing conductors of the larger cross-sectional areas and permitting the gases to escape in contact with unwelded portions of the material for cleaning such unwelded portions.

4. A method of welding, consisting in opposing fusible metallic parts to be welded under power-pressure one towards another during the fusing of opposed portions of the parts by a suitable electric current; in applying power-pressure members to such parts through a pair of thereto opposed coolable plate electrodes insulated from the pressure members and in electric conducting contact with said parts; in making such electrodes members of the welding circuit; in cooling the plate electrodes during the flow of the current and the application of pressure; and, during the flow of the current and application of the pressure, in keeping the parts to be welded successively spaced apart by fusible, spaced apart, metallic, electric conductors of gradually reduced cross-sectional areas; in successively fusing the conductors and opposed areas of the parts to be welded by the current; and in uniting the fused material under said pressure.

Signed at New York, in the county of New York and State of New York, this 27th day of June, A. D. 1921.

IRA W. HENRY.